(12) United States Patent
Islam et al.

(10) Patent No.: US 8,944,461 B2
(45) Date of Patent: Feb. 3, 2015

(54) AIRBAG IN PRIVACY WALL

(71) Applicant: Zodiac Seats France, Issoudun (FR)

(72) Inventors: Rakibul Islam, Rancho Cucamonga, CA (US); Robert W. Trimble, Gainesville, TX (US); Raul Daniel Flores Aguirre, Chihuahua (MX); Frederic Quatanens, Issoudon (FR); Jeremy Cailleteau, St. Aout (FR); Jeremy Gaudin, Saint-Maur (FR); Virgile Martinez, Segry (FR); Jean-Marc Obadia, Maubec (FR)

(73) Assignee: Zodiac Seats France, Issoudun (FR)

( * ) Notice: Subject to any disclaimer, the term of this patent is extended or adjusted under 35 U.S.C. 154(b) by 0 days.

(21) Appl. No.: 14/054,448

(22) Filed: Oct. 15, 2013

(65) Prior Publication Data
US 2014/0077478 A1    Mar. 20, 2014

Related U.S. Application Data

(63) Continuation of application No. 13/428,123, filed on Mar. 23, 2012, now Pat. No. 8,556,291.

(60) Provisional application No. 61/504,730, filed on Jul. 6, 2011.

(51) Int. Cl.
   *B60R 21/16*  (2006.01)

(52) U.S. Cl.
   USPC .......................................... 280/730.2

(58) Field of Classification Search
   USPC ............................................ 280/733, 730.2
   See application file for complete search history.

(56) References Cited

U.S. PATENT DOCUMENTS

| | | | | |
|---|---|---|---|---|
| 3,836,168 A | * | 9/1974 | Nonaka et al. | 280/733 |
| 5,322,322 A | | 6/1994 | Bark et al. | |
| 5,464,246 A | * | 11/1995 | Castro et al. | 280/730.2 |
| 5,480,181 A | * | 1/1996 | Bark et al. | 280/730.2 |
| 5,547,149 A | * | 8/1996 | Kalberer et al. | 244/121 |
| 5,941,564 A | * | 8/1999 | Acker | 280/743.2 |
| 6,029,993 A | * | 2/2000 | Mueller | 280/730.2 |
| 6,152,481 A | * | 11/2000 | Webber et al. | 280/730.2 |
| 6,508,487 B2 | * | 1/2003 | Koster | 280/730.2 |
| 6,517,110 B1 | * | 2/2003 | Butters et al. | 280/749 |
| 6,612,611 B1 | * | 9/2003 | Swann et al. | 280/730.2 |
| 6,623,031 B2 | * | 9/2003 | Haland et al. | 280/729 |
| 7,086,663 B2 | * | 8/2006 | Honda | 280/730.2 |
| 8,556,291 B2 | | 10/2013 | Islam et al. | |

(Continued)

FOREIGN PATENT DOCUMENTS

| | | |
|---|---|---|
| EP | 1110808 | 6/2001 |
| FR | 2753664 | 3/1998 |

(Continued)

OTHER PUBLICATIONS

Office Action dated Apr. 25, 2012 in U.S. Appl. No. 13/428,123.
Notice of Allowance dated Jul. 9, 2013 in U.S. Appl. No. 13/428,123.
Extended European Search Report dated Oct. 1, 2012 in Application No. EP12165075.8.

*Primary Examiner* — Faye M. Fleming
(74) *Attorney, Agent, or Firm* — Kilpatrick Townsend & Stockton LLP; Dean W. Russell, Esq.; Kristin M. Crall, Esq.

(57) ABSTRACT

Embodiments of the present invention provide an airbag system designed to deploy from a privacy wall in a diagonal manner.

14 Claims, 2 Drawing Sheets

(56) References Cited

U.S. PATENT DOCUMENTS

2013/0009009 A1 1/2013 Islam et al.
2013/0088056 A1* 4/2013 Quatanens et al. ...... 297/216.13

FOREIGN PATENT DOCUMENTS

| GB | 2385303 | 8/2003 |
|----|---------|--------|
| WO | 2005082682 | 9/2005 |

* cited by examiner

AIRBAG IN PRIVACY WALL

CROSS REFERENCE TO RELATED APPLICATIONS

This application claims the benefit of U.S. Provisional Application Ser. No. 61/504,730, filed Jul. 6, 2011, titled "Airbag in Privacy Wall," and U.S. Ser. No. 13/428,123, filed Mar. 23, 2012, titled "Airbag in Privacy Wall," the entire contents of each of which are hereby incorporated by reference.

FIELD OF THE INVENTION

Embodiments of the present invention relate generally to airbags for use in passenger transport vehicles. The airbags are designed to safely interrupt a passenger's forward momentum in the event of a crash condition.

BACKGROUND

Airbags are occupant restraining devices, which typically include a flexible envelope or "bag" that is designed to inflate rapidly during a collision in order to prevent the vehicle's occupants from striking interior objects located in front of (or, in some cases, on the side of) the occupant. In automobiles, airbags are designed to prevent occupants from striking the steering wheel, the vehicle door, a window, or any other interior objects. In aircraft, airbags are designed to prevent passengers from striking the seat in front each passenger, the tray tables, a window, or any other interior objects. Airbags on passenger rail cars (such as trains, monorails, trolleys), motorcycles, and other passenger transport vehicles work similarly.

Most modern vehicles contain multiple airbags. For example, most automobiles provide an airbag in front of each occupant seating position (at least in the front seat), to protect the head and torso. They may also contain knee airbags, which protect the occupant's knees and legs. Most aircraft provide airbags either positioned in the back of each seat (so as to deploy for the passenger sitting behind that seat) or in the seat belts. (For example, passengers sitting in the front seat or bulkhead in the aircraft do not have a seat in front of them, so in this instance, the airbag may be positioned in the passenger seat belt.) Passenger vehicles may also contain airbags in side locations, which can inflate between an occupant and the vehicle door or the vehicle window or wall.

Typically, sensors deploy one or more airbags in an impact zone at variable rates based on the type and severity of impact. Most airbags are designed to only inflate in moderate to severe frontal crashes. Airbags are normally designed with the intention of supplementing the protection of an occupant who is correctly restrained with a seatbelt.

Airbags are typically designed as large bags that require a large volume of gas for their inflation. They are typically round in shape, or peanut shaped, often formed by sewing two or three panels together in order to form a balloon or peanut shape.

Since their invention in the early 1950's and introduction in the mid-1970's, airbags have continually been improved upon. However, further airbag improvements are desirable, including airbags that have varying designs for varying types of seating arrangements in passenger vehicles.

BRIEF SUMMARY

Embodiments of the invention described herein provide airbags that are designed to deflect a vehicle occupant away from a privacy wall or other interior wall structure.

DETAILED DESCRIPTION

There may be some instances in which it is not desirable for a vehicle airbag to actually "catch" or capture or otherwise envelope the vehicle occupant within the airbag material. For example, the present inventors have sought to develop an airbag that, rather than "catching" the occupant, deviates the occupant's movement away from one or more hazardous structures, such as a side wall portion of a privacy wall or other interior structure wall, as well as braces the occupant's forward momentum toward a forward structure, such as a front wall portion of a privacy wall. The airbags described herein generally have a shape and a securement or deployment location that guides the vehicle occupant from the beginning of movement during a crash away from the privacy wall or other structure.

This may be particularly beneficial in an aircraft, where privacy walls or shells are often used on aircraft that are designed for extended travel lengths. Privacy walls are positioned between seats in order to provide passengers with more space and privacy, for example, for reclining the seat to rest on a transatlantic flight. Privacy walls are generally curved structures that provide a side wall that curves into a front wall. However, the presence of privacy walls can also present an additional interior structure into which a vehicle occupant may collide in the event of a crash condition. The present inventors, however, have designed airbags that may be positioned within privacy walls for preventing the occupant from colliding therewith.

Although the embodiments are shown and described herein with respect to an aircraft privacy wall, it should be understood that similar adaptations may be made in order to use the described airbags with other aircraft structures (such as side walls, seat backs, armrests, and so forth) or in an automobile, such as a car, truck, bus or any other passenger transport vehicle.

Figure 1:
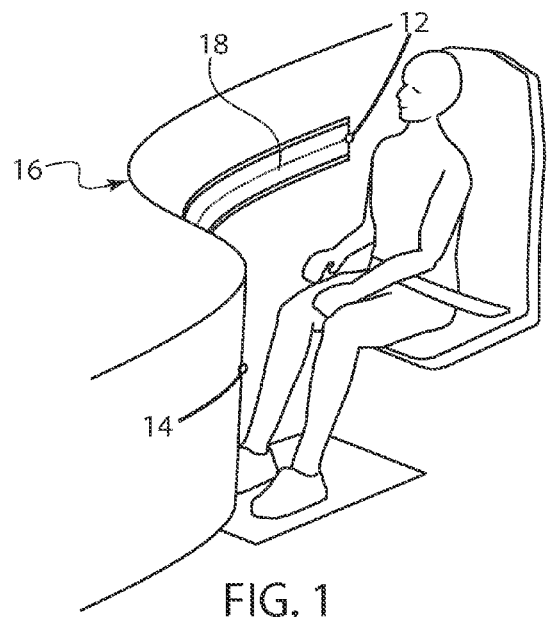
FIG. 1 shows a front perspective view of an airbag in a deployment position in a privacy wall according to one embodiment of this invention.

One embodiment of an airbag 10 designed for securement and positioning in a privacy wall is shown in FIGS. 1-4. The airbag 10 has a generally tubular cross-sectional shape, with a first connection end 12 and a second connection end 14. Connection ends 12, 14 provide two points of attachment for the airbag 10. As shown in FIG. 1, when the airbag 10 is in its storage position, it is positioned within the privacy wall 16. Privacy wall 16 may be designed with a line of weakness 18 or a breakable seam that allows fast deployment of airbag 10 in the event of a crash condition.

Figure 2:
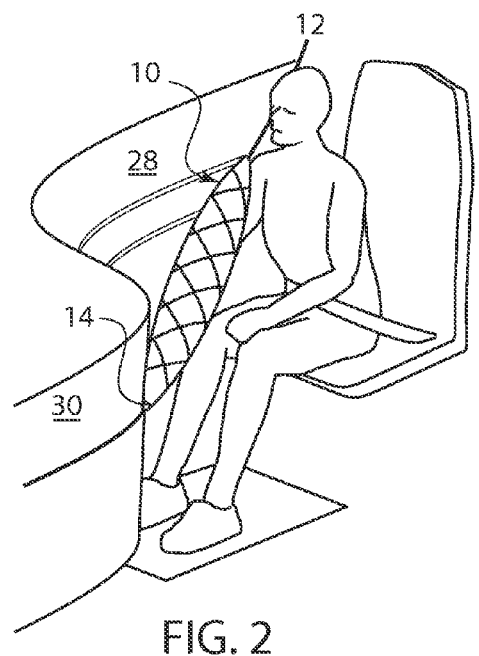
FIG. 2 shows a front perspective view of a privacy wall airbag that has been deployed.
Figure 3:
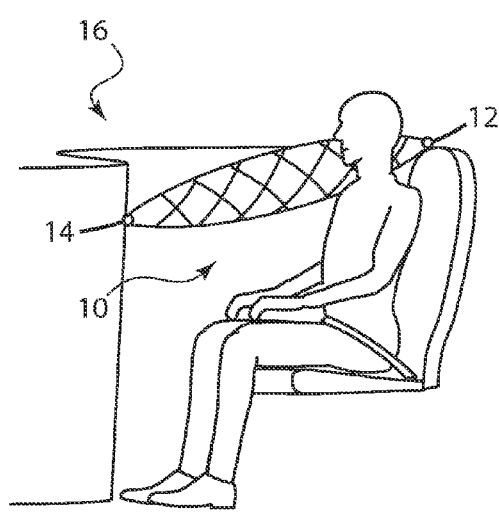
FIG. 3 shows a side perspective view of the deployed airbag of FIG. 2.
Figure 4:
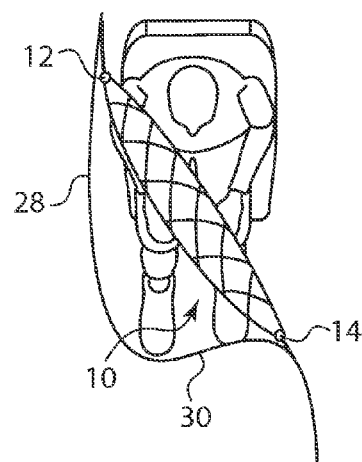
FIG. 4 shows a top plan view of the deployed airbag of FIG. 2.

Upon deployment, as shown in FIG. 2, airbag 10 extends in a diagonal direction, across the vehicle occupant. A top view of this diagonal deployment is shown in FIG. 4. Because of the curved nature of privacy wall 16, connection end 12 may be positioned close to or behind the occupant's shoulder, and connection end 14 may be positioned forward of the occupant.

Because of this diagonal positioning, airbag 10 is also fitted with a tension-applying support feature 20. Tension feature 20 may be a braid 22, such as a knitted or woven braid, that retracts or becomes shorter when the airbag 10 inflates. This reinforcing material 20 or braid 22 may be added over the material that forms the airbag, inside the material that forms the airbag, or it may be formed integrally with the material that forms the airbag.

Figure 5:
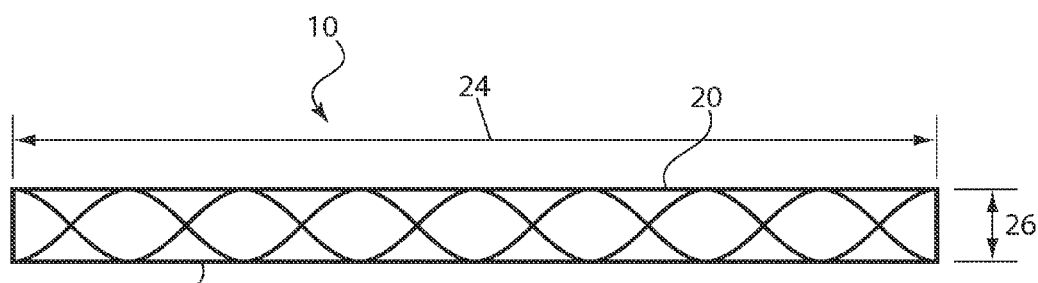
FIG. 5 shows one embodiment of an airbag in its non-inflated configuration.
Figure 6:
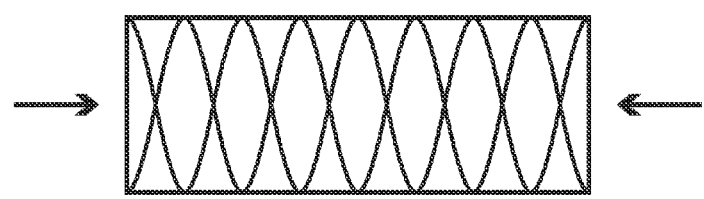
FIG. 6 shows the airbag of FIG. 5 in its inflated configuration.

One example of a braid 22 is illustrated in FIGS. 5 and 6. By retracting upon inflation, the braid 22 creates a slight tension on the airbag 10, thus causing airbag to get shorter in length while the airbag 10 expands in width. For example, as shown in FIG. 5, airbag 10 in its non-inflated position has a certain length 24 and a certain height 26. Once deployed, as illustrated by FIG. 6, the braid 22 causes the airbag 10 to shorten and widen, such that it has a shortened length that is less than length 24 and a wider or taller height than is greater than height 26. Providing a feature 20 that causes the airbag 10 to shorten and widen upon deployment allows the airbag 10 to provide the desired amount of cushion in order to deflect the vehicle occupant away from the privacy wall side 28 and to protect the occupant from crashing into the front wall 30 of the privacy wall.

Airbag 10 may be formed from a tubular layer of material that is rounded and then stitched or otherwise secured together at a side seam and front and back seams. Alternatively, it may be formed from a top and bottom layer of material that are stitched or otherwise secured together at a side seam that extends the entirety of the perimeter of the airbag. The material used for the airbag 10 may be any traditional airbag material, and the seams may be formed using any appropriate manufacturing method.

At least one portion of the airbag 10 has one or more openings for receiving inflation gas. In use and during a crash condition, inflation gas is immediately and rapidly pumped into the opening(s) in order to cause the airbag to inflate and cushion a vehicle occupant's forward momentum. For example, the airbag may inflate from a single end (near the connection end 12 or 14) or from both ends. The opening(s) of the airbag may have a tube fluidly connected to and extending therefrom. The tube(s) is/are also fluidly connected to a gas inflator system. In use, the airbag system is packed into a portion of the side wall 28 and extends into a partial portion of the front wall 30 of the privacy wall 18. Airbag 10 is accordingly flexible enough to be packed into the wall 16 in a curved or curvilinear shape.

Each airbag is associated with a system that is designed to deploy the airbag when needed, at the appropriate time. In one particular embodiment, a gas inflator and a crash sensor are mounted on or otherwise associated with the airbag. The gas inflator contains gas under high pressure that is restrained with a valve. The crash sensor is equipped with an accelerometer sensor that is designed to detect a crash condition. The gas inflator and the airbag are fluidly linked via a gas delivery tube. The gas inflator and the crash sensor may be linked via electric wiring or they may communicate wirelessly therebetween or with other aircraft components. In normal use, the airbag 10 maintains its stored position in the privacy wall 18. When a crash condition occurs, the crash sensor detects an abnormal acceleration and sends a signal to the gas inflator to open the valve and cause gas to flow into the airbag, causing the airbag to deploy. Airbag 10 may break through the line of weakness 18 or breakable seam in order to fully deploy. Deployment of the airbag 10 causes an immediate activation of the braid 22, which, as the airbag is inflating, also causes the airbag length to shorten and the airbag width to increase. This allows the airbag to safely brace the vehicle occupant's forward momentum and prevent a collision with the privacy wall side 28 or front wall 30.

It should be understood that changes and modifications, additions and deletions may be made to the structures and methods recited above and shown in the drawings without departing from the scope or spirit of the invention and the following claims.

What is claimed is:

1. An airbag system, comprising:
an airbag deployable from a structure, the airbag having a first connection end and a second connection end; wherein the first connection end is configured to be secured within a side wall portion of the structure and wherein the second connection end is configured to be secured within a front wall portion of the structure, the front wall portion located in front of an occupant sitting behind the structure, such that the airbag deploys across the occupant in a diagonal manner.

2. The airbag system of claim 1, wherein the airbag comprises a tension-applying support feature that causes the airbag to shorten in length and increase in height upon deployment.

3. The airbag system of claim 2, wherein the tension-applying support feature comprises a woven or knitted braid.

4. The airbag system of claim 1, further comprising a gas inflator in fluid communication with the airbag, and a crash sensor configured to activate inflation of the airbag.

5. The airbag system of claim 1, wherein the airbag comprises a generally tubular cross-sectional shape.

6. An airbag designed for deployment from an aircraft structure, comprising a first connection end, a second connection end, and a tension-applying support feature; wherein the first connection end is configured to be secured on a side portion of the structure and wherein the second connection end is configured to be secured on a front portion of the structure that is in front of a passenger, such that the airbag deploys across the passenger in a diagonal manner.

7. The airbag of claim 6, wherein the tension-applying support feature comprises a woven or knitted braid.

8. The airbag of claim 6, further comprising a gas inflator in fluid communication with the airbag, and a crash sensor configured to activate inflation of the airbag.

9. The airbag of claim 6, wherein the airbag comprises a generally tubular shape.

10. The airbag of claim 6, wherein the structure comprises a privacy structure, and wherein airbag is installed in the privacy structure.

11. The airbag system of claim 1, wherein the airbag is installed in the structure.

12. The airbag system of claim 1, wherein the structure comprises a privacy wall.

13. The airbag system of claim 1, wherein the structure comprises a seat surround.

14. The airbag system of claim 1, wherein the structure comprises a monument.

* * * * *